United States Patent Office 3,712,926
Patented Jan. 23, 1973

3,712,926
PRODUCTION OF N-POLYALKOXYMETHYL-AMIDES
Harro Petersen, Frankenthal, Germany, assignor to Badische Anilin- & Soda-Fabrik Aktiengesellschaft, Ludwigshafen (Rhine), Germany
No Drawing. Filed Apr. 25, 1969, Ser. No. 819,494
Int. Cl. C07c 103/30
U.S. Cl. 260—561 K                1 Claim

ABSTRACT OF THE DISCLOSURE

The production of N-polyalkoxymethylamides by reaction of carboxamides or their N-methylol compounds or N-methylol ether compounds with formaldehyde followed by reaction of the reaction mixture formed with alkanols, and the new N-polyalkoxymethylamides themselves. The new products are crosslinkers for curable surface coating compositions and valuable starting materials for the production of raw materials for surface coating compositions and plastics.

---

This invention relates to the production of N-polyalkoxymethylamides by reaction of carboxylic amides or their N-methylol or N-methylol ether compounds with formaldehyde, followed by reaction of the reaction mixture formed with alkanols, and to new substances of this type.

It is known that primary amides can be converted by reaction with formaldehyde in alkaline solution into N-monomethylol compounds (Liebigs Annalen der Chemie, volume 343 (1905), page 207; volume 361 (1908), page 113). In alkaline solution, the methylolamides are slowly converted into bis-acylamidomethyl ethers (Kunststoffe, volume 41 (1951), page 221). Reaction of N-monomethylolamides with a second molecule of formaldehyde to form definite N,N-dimethylolamides does not take place (Kunststoffe, volume 41 (1951), page 221). Methylolation of carboxylic amides also takes place in the presence of acids (Liebigs Annalen der Chemie, volume 343 (1905), page 207) and the methylol compounds are readily converted into methylene-bis-acylamides (Liebigs Annalene der Chemie, volume 343 (1905), page 207; volume 361 (1908), page 113). Conversion of carboxylic amides with formaldehyde in the presence of acids to form dimethylol compounds cannot be achieved.

It is an object of this invention to provide a new process for the production of N-polyalkoxymethylamides in good yields and high purity starting from simple starting materials.

Another object of this invention is the new N-polyalkoxymethylamides.

These and other objects of the invention are achieved and N-polyalkoxymethylamides having the general formula:

$$R^1-CO-N\begin{matrix}CH_2OR^2\\CH_2OR^2\end{matrix} \quad (I)$$

in which $R^1$ and $R^2$ may be identical or different and each denotes an aliphatic radical and $R^1$ may also denote the radical:

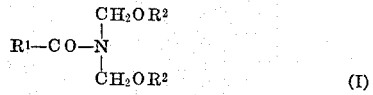

or the radical:

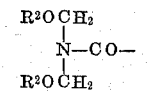

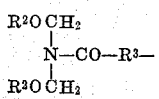

in which $R^2$ has the meaning given above and $R^3$ denotes an aliphatic radical, are advantageously obtained by reacting in a first step an amide having the general formula:

$$R^4-CO-NH-CH_2OR^2 \quad (IV)$$

or an N-methylolamide having the general formula:

$$R^4-CO-NH-CH_2OH \quad (III)$$

or an amide-N-methylol ether having the general formula:

$$R^4-CONH_2 \quad (II)$$

in which $R^4$ denotes an aliphatic radical, the radical $$H_2N-CO-$$

the radical $H_2N-CO-R^3$, the radical $$HOCH_2-HN-CO-R^3-$$

the radical $R^2OCH_2-HN-CO-R^3-$, the radical $$HOCH_2-HN-CO-$$

or the radical $R^2OCH_2-HN-CO-$ and $R^2$ and $R^3$ have the above meanings, with formaldehyde in an at least equivalent amount with reference to the replaceable hydrogen atoms of the amide group(s) of the starting material (II), (III) or (IV) in the presence of a base and in a second step reacting the reaction mixture thus formed with an alkanol having the general formula:

$$R^2OH \quad (V)$$

in which $R^2$ has the above meaning in the presence of an acid.

The reaction may be represented by the following equation when acetamide and methanol are used:

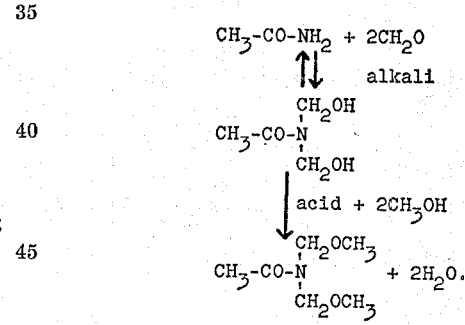

In view of the state of the art it is surprising that the process according to the invention, using simple starting materials, gives a large number of N,N-dialkoxymethyl-amides and N,N,N',N'-tetraalkoxymethyldiamides in good yields and high purity. In particular it could not have been expected that in an acid medium these N-alkoxymethyl compounds (N,O-acetals) would be formed at all to any substantial extent and would not be decomposed again into their starting materials.

Amides, N - methylolamides and N - methylol ether amides of monocarboxylic and dicarboxylic acids having the General Formulae (II), (III) and (IV) are used as starting materials. The starting materials (III) may be prepared by reaction of the starting materials (II) with formaldehyde by a prior art method. Starting materials (IV) may be obtained from starting materials (III) for example by reaction with alkanols in an acid medium. Preferred starting materials (II), (III) and (IV) and consequently preferred end products (I) are those in whose formulae $R^4$ denotes an alkyl or alkenyl radical having from one to twenty, preferably from one to seven, carbon atoms (which may bear one or more alkoxymethyl or alkenyloxymethyl groups each having from two to six carbon atoms as substituents), the radical $H_2N-CO-$, the radical $H_2N-CO-R^3$, the radical the radical

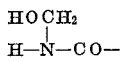

the radical

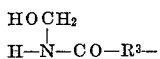

the radical

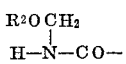

or the radical

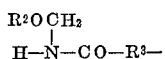

$R^2$ denotes an alkyl radical having one to five carbon atoms and $R^3$ denotes an alkyl radical having one to twelve, preferably one to eight, carbon atoms. The said alkyl and alkenyl radicals may be linear or branched. In the preferred end products $R^1$ and $R^2$ may be identical or different and $R^1$ denotes an alkyl or alkenyl radical having from one to twenty, preferably from one to seven, carbon atoms (which may bear one or more alkoxymethyl or alkenyloxymethyl groups each having from two to six carbon atoms as substituents), the radical

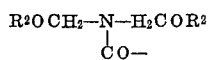

or the radical

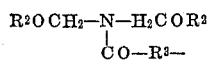

in which $R^2$ and $R^3$ have the meanings given above. In the preferred starting materials and end products $R^4$ and $R^1$, if they denote alkyl or alkenyl radicals, may bear, as substituents, groups and/or atoms which are inert under the reaction conditions, for example alkylamino or dialkylamino groups having from one to four carbon atoms, and chlorine and bromine atoms.

For example the following starting materials (II), (III) or (IV) may be used in the reaction: acetamide, propionamide, butyramide, stearamide, oleamide, β-methoxypropionamide, β-isopropylpropionamide, β-methylaminopropionamide, β-diethylbutyramide, β - chloropropionamide; corresponding N - methylolamides and their O-methyl or O-butyl ethers; oxalamide, adipamide, glutaramide, undecanoamide and their corresponding di-N-methylol compounds and di - N - methylol-O-ethyl ether compounds.

The starting materials (II), (III) or (IV) are reacted with formaldehyde in an at least equivalent amount with reference to the replaceable hydrogen atoms of the amide group(s) of the starting materials (II), (III) or (IV) in the first step of the process. In the case of monoamides, N,N'-dimethylol diamides and N,N'-dimethylol ether diamides the amount of formaldehyde generally used is from 2 to 5 moles, in the case of N-methylol monoamides or N-methylol ether monoamides the amount of formaldehyde is from 1 to 4 moles and in the case of diamides the amount of formaldehyde is from 4 to 8 moles per mole of the corresponding starting material (II), (III) or (IV). Formaldehyde may be supplied to the reaction as an aqueous solution or in the form of paraformaldehyde.

The first step of the process is carried out in the presence of a base, preferably an alkali metal hydroxide or alkaline earth metal hydroxide, for example sodium hydroxide and calcium hydroxide; an alkali metal carbonate, for example sodium carbonate; or tertiary amine, for example pyridine. The base is generally used in an amount of from 0.5 to 10% by weight with reference to the starting material (II), (III) or (IV). As a rule the reaction takes place in the presence of a solvent which is inert under the reaction conditions such as water; aromatic hydrocarbons, for example benzene and toluene; ethers, for example benzene and toluene; ethers, for example dioxane and tetrahydrofuran; or mixtures of these solvents. It is advantageous to carry out the reaction in highly concentrated solutions, for example from 2 to 10, particularly 5 to 7, molar solutions of the starting materials (II), (III) or (IV) in the said solvents, particularly in water.

The result of the first step of the process is a reaction mixture which in the case of starting material (II) contains the corresponding N-methylolamide, unreacted starting material, formaldehyde and the corresponding N,N-dimethylolamide. The reaction mixture has a similar composition when starting material (III) is used, while in the case of starting material (IV) it contains the N-methylol-N-methylol ether amide, the N-methylol ether amide and formaldehyde.

The reaction mixture formed in the first step is then reacted in a second step with an alkanol having the General Formula V in the presence of an acid. Preferred starting materials (V) and consequently preferred end products (I) are those in whose formulae $R^2$ has the preferred meaning given above, for example methanol, ethanol, isopropanol or isobutanol. The starting material (V) is used as a rule in an at least stoichiometric amount with reference to the starting material (II), (III) or (IV) or preferably in excess, for example twice to ten times the stoichiometric amount. When starting material (IV) is used the reaction mixture is advantageously reacted in the second step of the process with the alkanol (V) corresponding to the ether group of the starting material (IV), otherwise corresponding mixtures of end products (I) are formed. In such cases the amount of alkanol (V) used can be decreased in accordance with the amount of alkanol combined in the starting material (IV). If desired all or part of the alkanol (V) may be used in the first step as solvent and then reacted in the second step with the said reaction mixture, if necessary with an addition of a further amount of alkanol.

The acid required for the second step of the process may be an inorganic acid, for example sulfuric acid, hydrogen chloride and phosphoric acid, or an organic acid, for example acetic acid, oxalic acid, adipic acid, phthalic acid, benzenesulfonic acid and p-toluene-sulfonic acid. They are generally used in an amount of from 1 to 10% by weight with reference to the amount of starting material (II), (III) or (IV) on which the reaction mixture is based. Generally the alkanol (V) and if desired all or part of the solvent used in the first step serves as the solvent also for the second step. If desired further amounts of these solvents may be added. In the second step of the process it is advantageous to use from 2 to 10 molar solutions with reference to the starting material (II), (III) or (IV) on which the reaction mixture is based.

The first and second steps of the process are as a rule carried out at a temperature of from 0° to 100° C., preferably from 20° to 60° C.; they may be carried out at atmospheric or superatmospheric pressure, continuously or batchwise.

The two steps of the process may be carried out as follows: A mixture of starting material (II), (III) or (IV), formaldehyde and base with or without solvent is kept for from two to five hours at the reaction temperature, then neutralized with acid and if necessary concentrated. The alkanol (V) and acid are then added and the resulting mixture is kept at the reaction temperature for from one to three hours while mixing well. The mixture is then neutralized and the end product is separated in the usual way, for example by fractional distillation or crystallization.

The compounds obtainable by the process according to this invention are valuable auxiliaries for the production of impregnating resins. In general, solutions of melamine-formaldehyde impregnating resins have only a short storage life; small additions of N,N-dialkoxymethylamides however increase storage life very considerably. For example, a resin solution having good storage life is obtained when a mixture of 126 parts of melamine, 162 parts of a 37% formaldehyde solution and 78 parts of water is condensed with 20 parts of N,N-dimethoxymethylpropienamide at 85° C. and a pH of 9.1 set up by the addition of dilute caustic soda solution.

The invention is illustrated by the following examples in which the parts given are parts by weight.

EXAMPLE 1

A mixture of 590 parts of acetamide, 600 parts of paraformaldehyde, 50 parts of water and 50 parts of 2-normal aqueous caustic soda solution is heated in a stirred vessel for three hours at 50° C. Then the reaction mixture is neutralized with hydrochloric acid and concentrated to 1185 parts at subatmospheric pressure. A mixture of 2000 parts of methanol and 30 parts of concentrated hydrochloric acid is then added and the solution thus formed is heated at 40° C. for two hours while stirring. After the solution has been neutralized with concentrated caustic soda solution, the excess methanol and the water of reaction are evaporated off under subatmospheric pressure. 1170 parts of N,N-dimethoxymethylacetamide is obtained as a crude product. This is equivalent to a yield of 80% of the theory. The product may be purified by distillation in a high vacuum. Its boiling point is 69° to 71° C. at 0.1 mm. Hg.

*Analysis.*—$C_6H_{13}O_3N$ (147): Calculated (percent): C, 49.0; H, 8.83; O, 32.7; N, 9.53; $CH_2O$, 40.8; $CH_3O$, 42.2. Found (percent): C, 48.8; H, 8.8; O, 32.3; N, 9.4; $CH_2O$, 40.2; $CH_3O$, 41.9.

EXAMPLE 2

A mixture of 1030 parts of β-methoxypropionamide, 600 parts of paraformaldehyde, 50 parts of water and 50 parts of 50% caustic soda solution is heated for four hours at 50° C. in a stirred apparatus while stirring. The solution is neutralized with concentrated hydrochloric acid and concentrated to 1700 parts at subatmospheric pressure. A mixture of 2500 parts of methanol and 50 parts of concentrated hydrochloric acid is added and the solution is heated for two hours at 40° C. and then neutralized with concentrated caustic soda solution. Excess methanol and the water of reaction formed in the acetalization are distilled off. 1600 parts of N,N-dimethoxymethyl-β-methoxypropionamide is obtained as a crude product. This corresponds to a yield of 84% of the theory. The product may be purified by fractional high-vacuum distillation. The boiling point is from 108° to 114° C. at 0.1 mm. Hg.

*Analysis.*—$C_8H_{17}O_4N$ (191): Calculated (percent): C, 50.3; H, 8.9; O, 33.5; N, 7.33; $CH_2O$, 31.4; $CH_3O$, 48.7. Found (percent): C, 49.9; H, 9.0; O, 32.9; N, 7.4; $CH_2O$, 31.2; $CH_3O$, 48.5.

EXAMPLE 3

146 parts of propionamide is mixed with 400 parts of 30% formaldehyde and heated for two hours at 50° C. with an addition of 50 parts of 2-normal caustic soda solution. Without having been neutralized, the reaction mixture is then concentrated to 270 parts at subatmospheric pressure and at from 40° to 50° C. The syrupy residue is stirred with 500 parts of methanol and 35 parts of concentrated hydrochloric acid for two hours at 50° C. The whole is neutralized with caustic soda solution, and excess methanol and water of reaction are distilled off under subatmospheric pressure. Sodium chloride is filtered off and 277 parts of crude end product is obtained (86% of the theory).

The N,N-dimethoxymethylpropionamide can be obtained in pure form by fractional high-vacuum distillation. The boiling point is from 80° to 81° C. at 0.5 mm. Hg.

*Analysis.*—$C_7H_{15}O_3N$ (161): Calculated (percent): C, 52.1; H, 9.32; N, 8.69; $OCH_3$, 38.5; $CH_2O$, 37.3. Found (percent): C, 52.0; H, 9.6; N, 8.7; $OCH_3$, 37.8; $CH_2O$, 37.0.

EXAMPLE 4

262 parts of β-propoxypropionamide with 308 parts of 39% by weight formaldehyde and an addition of 40 parts of 2-normal caustic soda solution are heated for two hours at 50° C. and then, without neutralization, concentrated to 345 parts at 50° C. at subatmospheric pressure. The syrupy residue has 500 parts of methanol and 40 parts of concentrated hydrochloric acid added to it and the whole is heated for two hours at 50° C. Following neutralization with concentrated caustic soda solution and filtration, the reaction mixture is evaporated at 50° C. at subatmospheric pressure. 330 parts of N,N-dimethoxymethyl-β-propoxypropionamide is obtained as a crude product. This is equivalent to a yield of 75.4% of the theory. Purification is carried out by fractional high-vacuum distillation. The boiling point is from 119° to 120° C. at 0.5 mm. Hg.

*Analysis.*—$C_{10}H_{21}O_4N$ (219): Calculated (percent): C, 54.8; H, 9.58; N, 6.40; $OCH_3$, 28.3; $CH_2O$, 27.4. Found (percent): C, 54.7; H, 9.60; N, 6.6; $OCH_3$, 27.9; $CH_2O$, 26.9.

I claim:

1. An N-polyalkoxymethylamide having the formula:

$$R^1-CO-N\begin{matrix}CH_2OR^2\\ \\ CH_2OR^2\end{matrix} \quad (I)$$

in which $R^1$ denotes the radical

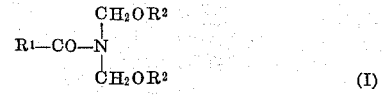
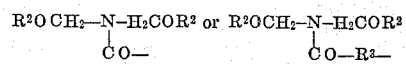

in which $R^2$ is an alkyl of 1–5 carbon atoms and $R^3$ denotes an alkylene radical of 1–12 carbon atoms.

References Cited

UNITED STATES PATENTS

| | | | |
|---|---|---|---|
| 3,327,018 | 6/1967 | D'Alelio | 260—249.6 X |
| 3,322,762 | 5/1967 | Erikson et al. | 260—249.6 |
| 3,515,754 | 6/1970 | Mod et al. | 260—558 |

FOREIGN PATENTS

| | | | |
|---|---|---|---|
| 790,796 | 2/1958 | Great Britain | 260—561 |
| 961,875 | 6/1964 | Great Britain | 260—561 |

OTHER REFERENCES

Vail et al., Journ. Org. Chem., vol. 27, June 1962, pp. 2067–2070.

LEWIS GOTTS, Primary Examiner

E. G. LOVE, Assistant Examiner

U.S. Cl. X.R.

260—67.6 R, 561 R, 561 B

PO-1050
(5/69)

UNITED STATES PATENT OFFICE
CERTIFICATE OF CORRECTION

Patent No. 3,712,926      Dated January 23, 1973

Inventor(s) Harro Petersen

It is certified that error appears in the above-identified patent and that said Letters Patent are hereby corrected as shown below:

Column 1, line 8, insert -- Claims priority, application Germany, May 9, 1968, P 17 68 393.1 --.

Column 2, line 4, "$R^4-CO-NH-CH_2OR^2$"   (IV)" should read -- $R^4-CONH_2$   (II) --; line 10, "$R^4-CONH_2$   (II)" should read -- $R^4-CO-NH-CH_2OR^2$   (IV) --.

Signed and sealed this 20th day of November 1973.

(SEAL)
Attest:

EDWARD M. FLETCHER, JR.      RENE D. TEGTMEYER
Attesting Officer      Acting Commissioner of Patents